Nov. 12, 1963    C. W. MERRILL ETAL    3,110,177
REMOTELY CONTROLLED POSITIONING APPARATUS
Filed July 15, 1960    7 Sheets-Sheet 1

INVENTORS.
CHARLES W. MERRILL
ALFRED A. GEBHARDT
BY
Christie, Parker & Hale
ATTORNEYS.

Nov. 12, 1963    C. W. MERRILL ETAL    3,110,177
REMOTELY CONTROLLED POSITIONING APPARATUS
Filed July 15, 1960    7 Sheets-Sheet 2

INVENTORS
CHARLES W. MERRILL
BY ALFRED A. GEBHARDT
Christie, Parker & Hale
ATTORNEYS

FIG. 7.

United States Patent Office 3,110,177
Patented Nov. 12, 1963

1

3,110,177
REMOTELY CONTROLLED POSITIONING
APPARATUS
Charles W. Merrill, Ontario, and Alfred A. Gebhardt, West Covina, Calif., assignors to Mefco Sales & Service Corporation, Arcadia, Calif., a corporation of California
Filed July 15, 1960, Ser. No. 43,156
13 Claims. (Cl. 73—143)

The present invention relates to apparatus including an auxiliary hoist control for the remote linear positioning of an object and is also utilizable to weigh objects and to conduct tensioning tests, as well as maintain a constant tension load.

An auxiliary hoist control of the general type particularly utilizable in the apparatus according to the present invention is disclosed in copending application, Serial No. 798,446, now Patent No. 3,025,702, filed March 10, 1959, by Charles W. Merrill and Alfred A. Gebhardt, and assigned to Mefco Sales and Service Corporation, the assignee of the present application. The auxiliary hoist control shown therein is operable when locally controlled to position objects.

The present application is a continuation-in-part of this application and relates to apparatus for the remote control of the auxiliary hoist control so as to provide for remotely controlled positioning of objects, and for weighing objects, conducting tension tests, applying constant tensions, and balancing loads for facile manual movement. As is pointed out in the aforesaid copending application, the auxiliary hoist control therein disclosed may be utilized as a tensioning device by prepressuring the compressible fluid storage area. The present application deals in particular with apparatus for accomplishing such controlled prepressuring from a remote position.

According to the present invention, the controlled prepressuring of a compressible fluid storage space in an auxiliary hoist control is accomplished by applying a selectable pressure of compressible fluid to the auxiliary hoist control. Means are provided to select and regulate the pressure of compressible fluid from a source under pressure and to apply the pressure-regulated fluid to the compressible fluid storage area of the auxiliary hoist control. In order to provide for mobility of the apparatus, an auxiliary compressible fluid supply storage associated with the pressure control means is utilized in the preferred embodiment. In the apparatus according to the invention, pressure within the compressible fluid storage space of the auxiliary hoist control is selectively increased by the application thereto, through the pressure control means, of compressible fluid at a pre-selected and regulated pressure, either from the aforementioned auxiliary compressible fluid source or a separate main compressible fluid source. The pressure within the compressible fluid storage space of the auxiliary hoist control is selectively decreased by removing, through the pressure regulated and control means, a portion of the compressed fluid contained within the compressible fluid storage space.

The invention may be more readily understood by reference to the accompanying drawings in which.

2

Figure 1:
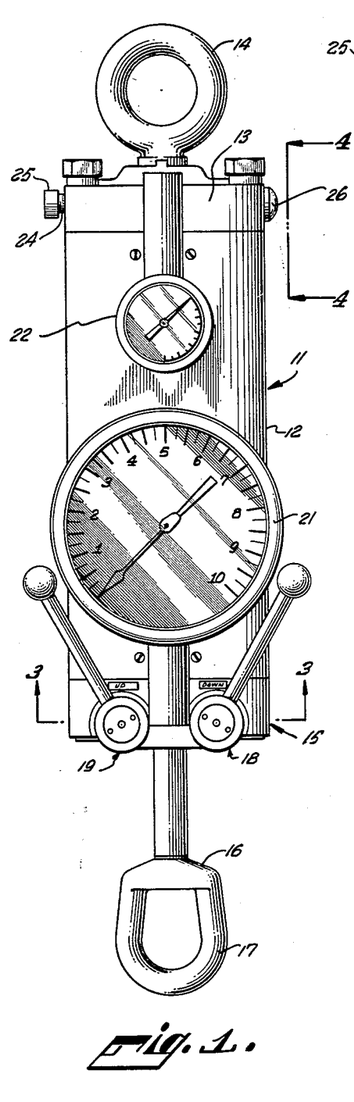
FIGURE 1 is a front elevation of an auxiliary hoist control.

Referring to FIG. 1, there is shown an auxiliary hoist control 11 which consists principally of a body portion 12, an upper head 13, to which a top eye 14 is connected, and a lower head 15. A rotatable socket 16 having a lower eye 17 is connected to a shaft extending through the lower head 15. The lower head 15 has a down valve assembly 18 and an up pump assembly 19 extending therethorugh. A hydraulic fluid pressure gauge 21 and a compressible fluid pressure gauge 22 are located on the body portion 12 of the auxiliary hoist control. A compressible fluid inlet connector 24 is utilized to apply a compressible fluid to the auxiliary hoist control. A connector cap 25 closes the connector 24 so as to seal the connector when a high-pressure hose (see FIG. 6) is not attached thereto. A breather cap 26 vents the space above the piston to the atmosphere through a passage 27 (see FIG. 2) in the upper head 13.

Figure 2:
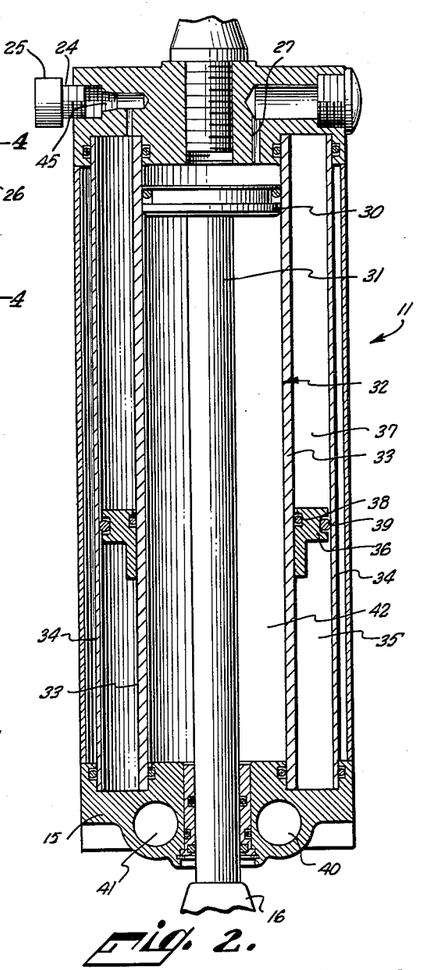
FIGURE 2 is a front elevation in section of the auxiliary hoist control.

FIGURE 2 shows a sectional elevation of the auxiliary hoist control 11 of FIG. 1. A piston 30 is connected to a piston rod 31, the lower end of which is attached to the lower eye 17. The piston is inserted in a first cylinder 32 having a wall 33. A second cylinder 34 is positioned about the first cylinder 32 so as to form a concentric annular volume with respect to the cylinder 32. This annulus has a lower portion 35 which is divided by a separator ring 36 from an upper portion 37. The lower portion 35 is used as, and hereinafter referred to as, the first hydraulic fluid storage space. The upper portion 37 is used as, and hereinafter referred to as, the compressible fluid storage space. The separator ring 36 has an inner O-ring 38 and an outer O-ring 39 which assist in forming a seal between the two storage areas. A down valve assembly bore 40 and an up pump assembly bore 41 are located in the lower head assembly 15. The space between the piston 30 and the lower head assembly 15 comprises a second hydraulic fluid storage space 42 which is connected to the first hydraulic storage space 35 by fluid passages (not shown) extending into the bores 40 and 41.

Figure 3:
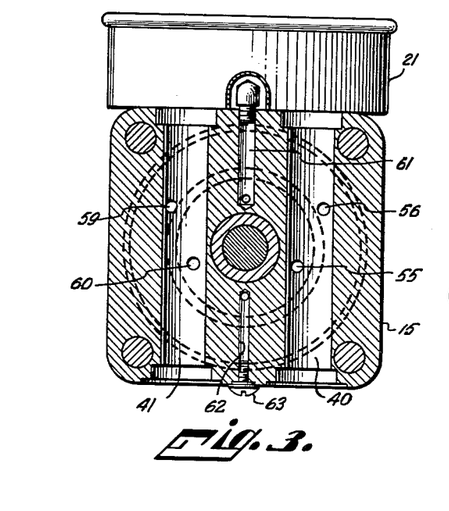
FIGURE 3 is a sectional view taken along lines 3—3 of FIG. 1 with the down valve assembly and up pump assembly removed.

FIGURE 3 is a sectional view of the lower head 15. Two bores 40 and 41 contain the down valve assembly 18 and the up pump assembly 19, respectively, which assemblies are not shown in FIG. 3 for purposes of clarity. A down valve assembly inlet hole 55 and outlet hole 56 provide apertures for passing hydraulic fluid from the second hydraulic fluid storage space 42 into the first hydraulic fluid storage space 35 by means of the down valve assembly 18. Up pump inlet and outlet holes 59 and 60 provide apertures for withdrawing hydraulic fluid from the first hydraulic fluid storage space 35 and injecting the fluid into the second hydraulic fluid storage space 42 in conjunction with the up pump assembly 19. A gauge passage 61 connects the second hydraulic fluid storage space 42 to the hydraulic fluid pressure gauge 21. A hydraulic fluid addition passage 62 is closed by a cap 63.

Hydraulic fluid is contained in the second hydraulic fluid storage space 42. When a tensioning load is applied between the top eye 14 and the lower eye 17, the hydraulic pressure exerted by the hydraulic fluid in the second hydraulic fluid storage space 42 increases. Through the action of the down valve assembly, as will subsequently be described, this hydraulic fluid is selectively passed from the second hydraulic fluid storage space 42 into the first hydraulic fluid storage space 35. A decrease in the volume of hydraulic fluid contained in the second hydraulic fluid storage space 42 due to the movement of the piston 30 in response to the tensioning load results in the movement of the piston rod 31 out of the lower head assembly 15 in proportion to the amount of hydraulic fluid passed into the first hydraulic fluid storage space 35.

An increase in the volume of hydraulic fluid stored in the first hydraulic fluid storage area 35 moves the separator ring 36 in a direction toward the upper head 13. Air or other compressible fluid is normally stored in the compressible fluid storage space 37. The movement upward of the separator ring 36 will compress the fluid stored in the compressible fluid storage space 37 in relation to the amount of movement of the separator ring 36 which occurs, and therefore in proportion to the amount of hydraulic fluid transferred from the second hydraulic fluid storage space 42 to the first hydraulic fluid storage space 35.

The auxiliary hoist control 11 is so constructed that there is an appreciable difference between the cross sectional area of the outer storage spaces 35 and 37 and the cross sectional area of the second storage space 42. The proportioning of these cross sectional areas permits the ultimate capacity of the unit to be widely varied so long as the structural limitations of the unit are not exceeded.

For example, assuming that there is a 1:2 ratio between the outer storage space cross section and the inner storage space cross section areas, the force which the compressible fluid will be required to exert on the separator ring, and consequently, on the hydraulic fluid, in order to exactly counterbalance a 20,000 pound tensioning force applied across the auxiliary hoist control 11 will be only 10,000 pounds. If the cross section area of the cylinder 32 is 50 square inches, when the compressible fluid has been compressed to a pressure of 400 pounds per square inch, the system will be in equilibrium.

Assuming that the piston 30 and the piston rod 31 are in their fully retracted position, the position shown in FIG. 2, and the compressible fluid in the upper annular area is at atmospheric pressure, when the piston 30 is subsequently moved toward the lower head 15 by the tensioning force of 20,000 pounds, the system will be in equilibrium when the compressible fluid is compressed to approximately one twenty-fifth of its original volume.

However, if the pressure existing in the compressible fluid area is appreciably greater than ambient pressure when the piston 30 and the piston rod 31 are in their fully retracted position, the application of the tensioning load of 20,000 pounds will cause the required 10,000 pounds pressure to be exerted by the compressible fluid upon the separator ring 36 prior to the piston 30 travel required for equilibrium in the preceding case. Thus, by prepressuring the upper annular storage area, it is possible to limit the ultimate extension of the auxiliary hoist control 11 in accordance both with the tensioning load applied and with the prepressuring used.

Figure 4:
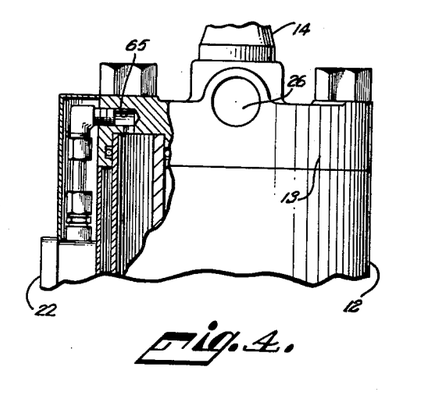
FIGURE 4 is a fragmentary elevation taken along lines 4—4 of FIG. 1, partially in section.

FIGURE 4 is an elevation, partially in section, showing the upper head 13. A compressible fluid gauge outlet passage 65 connects the compressible fluid gauge 22 to the upper annular storage area.

Figure 5:
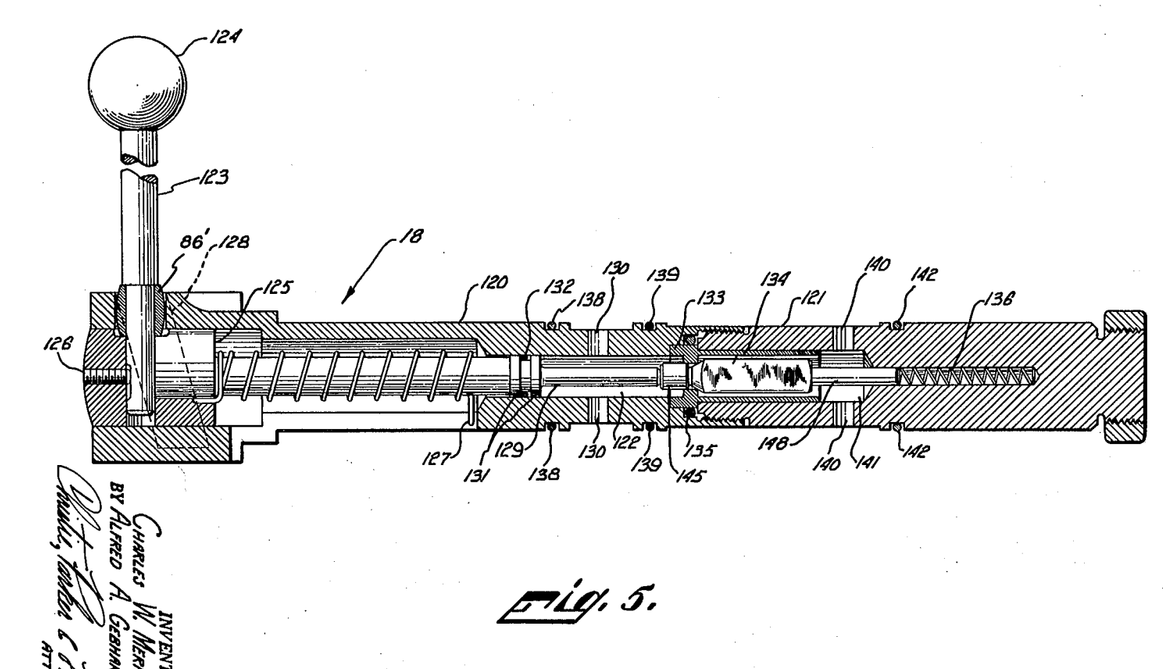
FIGURE 5 is a sectional view of the down valve of the auxiliary hoist control.

FIGURE 5 is a sectional view of the down valve assembly 18. The down valve assembly 18 consists of a body 120 and a body extension 121 which together contain the various parts of the valve. A down valve handle 123 having a knob 124 is inserted through the body 120 into the hollow central portion thereof. A valve actuator 125 is contained in a hollow central portion 122 of the body 120 and engages the handle 123. The handle 123 is held against the valve actuator 125 by means of a set screw 126. A torsion spring 127 is contained within the hollow cylindrical portion of the body 120 and is operable to return the valve handle 123 to the position shown when it has been rotated. A canted slot illustrated by the dotted line 128 allows the valve handle 123 to be rotated. A handle bearing 86 holds the handle 123 generally in position in the down valve assembly 18 and reduces friction due to handle movement. Rotation of the valve handle 123 causes the actuator 125 to move toward the body extension 121. The valve actuator 125 has a stem portion 129 extending through the hollow central portion 122. A pair of outlet holes 130 which open into the first hydraulic fluid storage space 35, extend through the body portion 120 and open into the hollow cylindrical central section 122. A seal of the hollow cylindrical central portion 122 in the direction of the valve handle 123 is formed by a pair of flanges 131 and an O-ring 132.

A valve seat 133 is located at the junction of the body 129 and the extension 121. A check valve piston 134 is contained within the check valve seat 133. The check valve piston 134 is of novel construction and illustrated in greater detail in FIG. 7. An O-ring 135 seals the junction between the body section 120, the extension section 121 and the valve seat 133.

The annular chamber formed by the hollow cylindrical central portion 122 and the stem 129 has dimensions such that its longitudinal cross section area is at least three times greater than its lateral cross sectional area with the valve handle 123 in the position shown. The use of this chamber configuration provides proper location of the inlet and outlet holes for the valve. A helper spring 136 located in the extension 121 holds the valve piston 134 against the valve seat 133. An O-ring 138 seals the outlet holes 130 in the direction of the valve handle 123. An O-ring 139 seals the outlet holes 130 in the opposite direction. A pair of inlet holes 140, which open into the second hydraulic fluid storage space 42, extend into a hollow central portion 141 of the extension 121 between the helper spring 136 and the valve seat 133. An O-ring 142 provides a seal adjacent the inlet holes 140.

Figure 6:
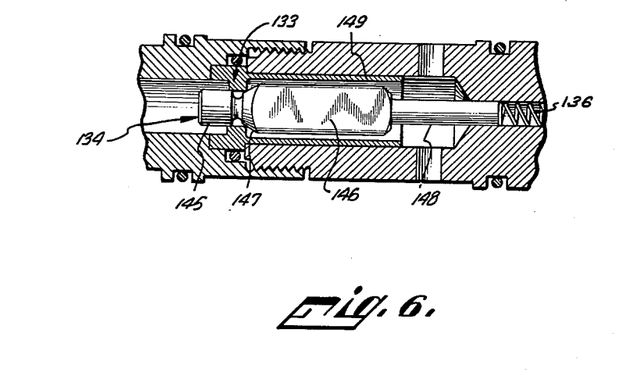
FIGURE 6 is an enlarged partial sectional view of the down valve piston illustrated in FIG. 5.

FIGURE 6 shows in detail the construction of the valve piston 134 and valve seat 133. The valve piston 134 consists of a piston head 145 which is connected to a main body portion 146 by a shoulder 147. A stem 148 extends from the main body portion 146 in the opposite direction from the piston head 145. The piston head 145 has a slight narrowing taper in the direction away from the main body portion 146.

It should be noted that the valve piston 134 consists of an integral unit contained within the valve seat 133. The valve seat 133 has an annular portion 149 extending down the main body portion 146. The main body portion 146 preferably is constructed of a square stock having slightly rounded edges. With such a construction, the extended annular portion 149 of the valve seat 133 surrounding the main body portion 146 serves to align the head portion 145 and shoulder portion 147 with the orifice of the valve seat 133, while the stem projecting from the main body portion 146 in the opposite direction from the piston head 145 serves to provide firm contact with the helper spring 136 contained in the extension 121.

To operate the down valve assembly 18, the down valve handle 123 is rotated clockwise along the canted slot 128, driving the actuator 125 in the direction of the extension 121. The stem of the actuator 125 is in contact with the face of the valve piston head portion 145. Prior to rotation of the down valve handle 123, the valve seat 133 and the valve piston shoulder 147 form a seal to prevent movement of fluid from the inlet holes 140 through the valve assembly toward outlet holes 130. The movement of the piston 134 caused by the actuator stem 129 driving the piston stem 148 against the helper spring 136 opens the seal formed between the shoulder 147 and the valve seat 133. However, the piston head 145 is contained within the orifice of the valve seat 133. A small annular bypass area between the piston head portion 145 and the valve seat 133 exists. This small annular volume allows the movement of hydraulic fluid from the inlet holes 140 to the outlet holes 130. As the rotation of the valve handle 123 continues, the piston head portion 145 is moved further back within the valve seat orifice. After the portion of the valve head portion 145 adjacent the shoulder 147 passes completely through the orifice, further movement of the valve head portion 145 in this direction will result in an increase in the annular cross section available for the passage of hydraulic fluid, due to the taper of the valve head portion 145. Therefore, the rate of passage of fluid through the down valve assembly 18 is proportional to the amount of rotation of the down valve handle 123 after the constant rate displacement of the piston head 145 has been exceeded.

When the pressures existing on the hydraulic fluid in the second hydraulic fluid storage space 42 and the hydraulic fluid in the first hydraulic fluid storage space 35 are equal, no flow of fluid through the down valve assembly 18 can occur. If the valve handle 123 is thereupon returned to the position shown in FIG. 3, the helper spring 136 will force the piston shoulder 147 against the valve seat 133, thereby again sealing the annular storage chamber against further passage of hydraulic fluid into the first hydraulic fluid storage space 35.

When the tension causing the extension of the auxiliary hoist control 11 is removed, thereby releasing the pressure on the hydraulic fluid in the second hydraulic fluid storage space 42, the compressed fluid in the compressible fluid storage space 37 exerts pressure on the hydraulic fluid in the first hydraulic fluid storage space 35 which is greater than the pressure exerted on the hydraulic fluid in the second hydraulic fluid storage space 42. The down valve assembly 18, due to its unique construction, thereupon commences to function as a dump valve. The hydraulic fluid under high pressure in the first hydraulic fluid storage space 35 forces the piston head 145 to retract through the valve seat 133 orifice. Hydraulic fluid flows from the first hydraulic fluid storage space 35 through the outlet holes 130, the valve seat 133 orifice, the inlet holes 140 and into the second hydraulic fluid storage space 42. This flow of fluid continues until the piston 30 and piston rod 31 have been completely retracted or until the pressures on opposite sides of the separator ring 36 are equalized.

Figure 7:
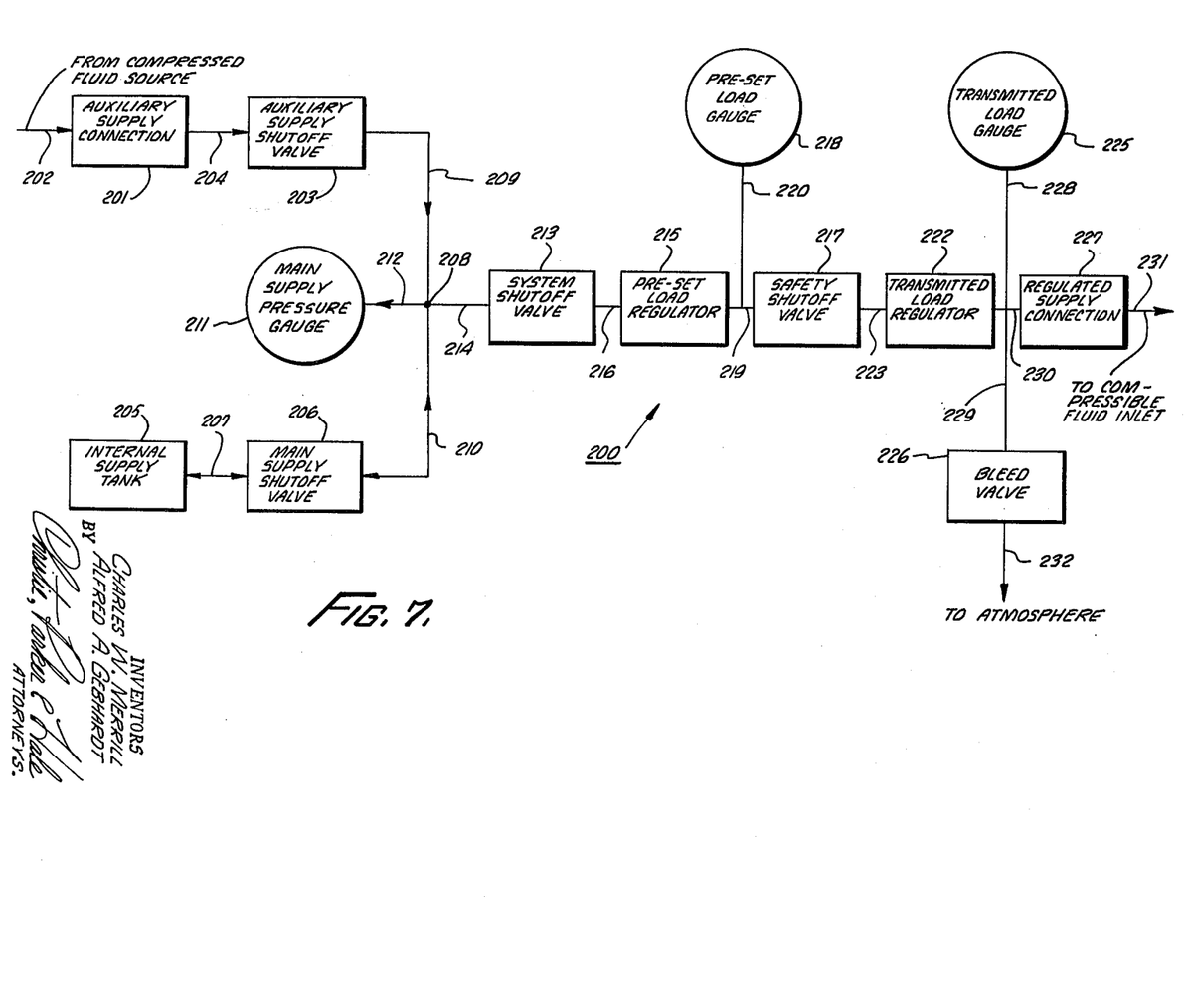
FIGURE 7 is a block diagram of control means according to the invention.

FIGURE 7 is a block diagram of a control means 200 for selectively applying a preselected pressure of compressible fluid to the auxiliary hoist control 11 of FIG. 1. A readily available and compaartively inexpensive compressible fluid which is utilizable with the apparatus is nitrogen, although other fluids can be used. Nitrogen has the advantage of being inert, so as not to introduce an explosion hazard.

As shown in FIG. 7, nitrogen from an external compressed nitrogen source (not shown) is applied to an auxiliary supply connection 201 through a high-pressure inlet line indicated by arrow 202. An auxiliary supply shutoff valve 203 is connected to the auxiliary supply connection 201 by a high-pressure connector 204. The auxiliary supply shutoff valve 203 may be, for example, a conventional high pressure on-off type valve. An internal supply tank 205 is connected to a main supply shutoff valve 206 by a high-pressure connection 207. The internal supply tank 205 is a high-pressure storage tank. In order to increase the system capacity, several high-pressure storage tanks may be connected in parallel. The main supply shutoff valve 206 may be of the same type as the auxiliary supply shutoff valve 203.

A supply junction connection 208 is connected to the auxiliary supply shutoff valve 203 and the main supply shutoff valve 206 by high-pressure connectors 209 and 210, respectively. A main supply pressure gauge 211 is connected to the main supply junction 208 by a high-pressure connection 212. A system shutoff valve 213 is connected to the supply junction 208 by means of a high-pressure connector 214. The system shutoff valve 213 may be of the same type as the shutoff valves 203 and 206. Thus, the main supply pressure gauge 211 registers the pressure existing in the high-pressure connector 214 through which the compressed nitrogen or other fluid is supplied to the control means 200.

The internal supply tank 205 is filled with fluid under pressure by closing the system shutoff valve 213 and opening the auxiliary supply valve 203 and the main supply shutoff valve 206. The internal supply tank 205 is thereby filled with fluid to whatever pressure is available from the external supply (not shown). The supply shutoff valves 203 and 206 are then closed, and the control means 200 is ready for operation in conjunction with the auxiliary hoist control 11.

A series of regulator and shutoff valves commencing with the system shutoff valve 213 functions to control the pressure of compressed nitrogen applied to the compressible fluid storage space 37 of the auxiliary hoist control 11. The system shutoff valve 213 is connected to a pre-set load regulator 215 by a high-pressure connector 216. The pre-set load regulator 215 is a pressure regulating valve of conventional high pressure construction. A safety shutoff valve 217 and a pre-set load gauge 218 are connected to the pre-set load regulator 215 output by means of high-pressure connectors 219 and 220, respectively. The pre-set load gauge 218 functions to indicate the total restorative pressure available to be applied to the compressible fluid storage space 37 at the particular setting of the pre-set load regulator 215 being utilized.

A transmitted load regulator 222 is connected to the safety shutoff valve 217 by means of a high-pressure connector 223. The transmitted load regulator 222 functions to set the actual pressure of compressed nitrogen applied to the compressible fluid storage space 37. A transmitted load gauge 225, a bleed valve 226 and a regulated supply connection 227 are connected to the transmitted load regulator 222 by means of high-pressure connectors 228, 229 and 230, respectively. The regulated supply connection 227 is connected to the compressible fluid inlet connector 24 of the auxiliary hoist control 11 (see FIG. 2) by a regulated pressure outlet line indicated by arrow 231, so as to apply the regulated pressure of compressed nitrogen to the compressible fluid storage space 37.

The transmitted load gauge 225 thus measures the pressure of compressed nitrogen applied to the compressible fluid storage space 37. Since, in the embodiment shown, the transmitted load regulator 222 is directly connected to the compressible fluid inlet connector 24 of the auxiliary hoist control 11, the transmitted load gauge 225 also reads the pressure in the compressible fluid storage space 37. When the auxiliary hoist control 11 is in equilibrium, the pressure within the compressible fluid storage space 37 is directly proportional to the load applied to the auxiliary hoist control 11. Therefore, the transmitted load gauge 225 may be calibrated to read directly in terms of the load applied to the auxiliary hoist control 11 as well as in the actual pressure of compressible fluid existing in the auxiliary hoist control 11.

The bleed valve 226 is connected to the compressible fluid storage space 37 through the regulated supply connection 227 and opens to the atmosphere through an outlet connection 232. The bleed valve 226 is utilized to reduce the pressure of compressible fluid within the compressible fluid storage space 37 as may be required in the operation of the apparatus.

Figure 8:
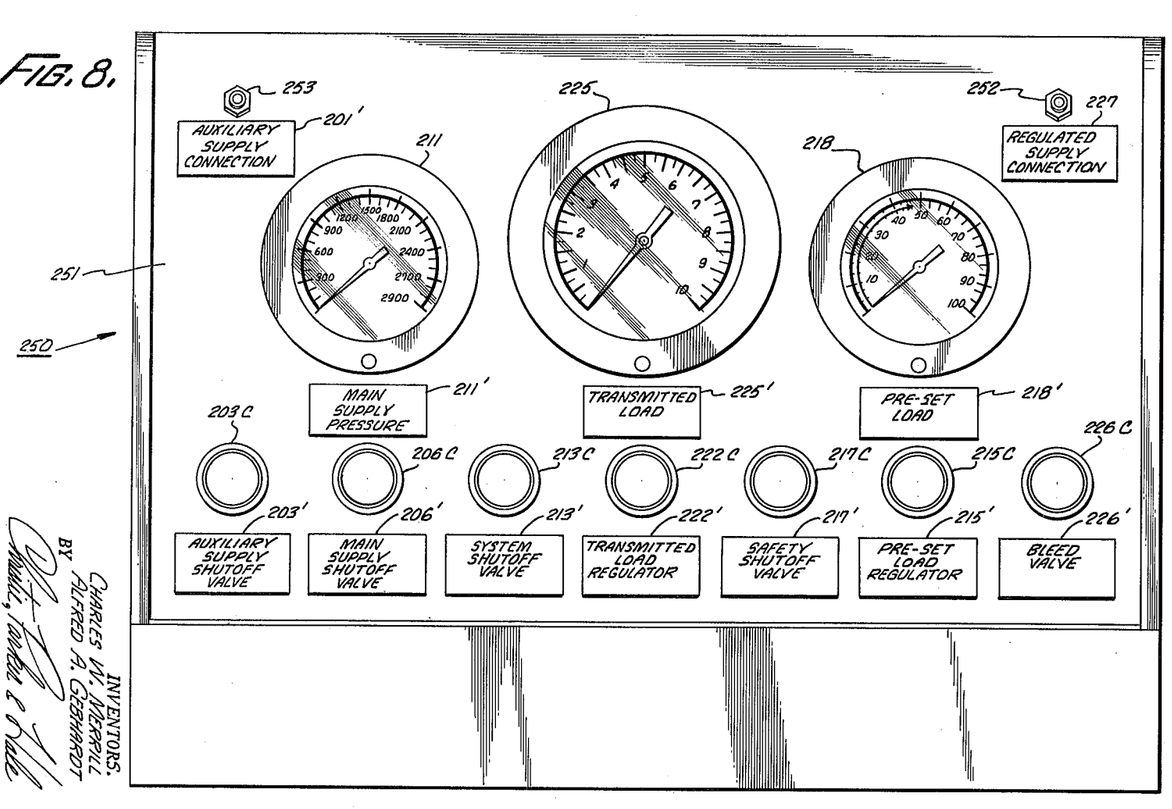
FIGURE 8 is a console containing the control apparatus of FIG. 7.

FIGURE 8 is a front elevation of a control console 250 containing the control means 200. The control console 250 has a slanted face 251 on which are mounted the auxiliary supply connection 201, the main supply pressure gauge 211, the pre-set load gauge 218, the transmitted load gauge 225 and the regulated supply connection 227.

The auxiliary supply connection 201 and the regulated supply connection 227 are closed by safety caps 252 and 253, respectively, when not in use, to prevent the accidental discharge of the compressed nitrogen stored in the internal supply tank 205.

The auxiliary supply shutoff valve 203 is mounted within the console and has an auxiliary supply shutoff valve control handle 203C extending out of the face 251. The main supply shutoff valve 206, the system shutoff valve 213, the pre-set load regulator 215, the safety shutoff valve 217, the transmitted load regulator 222 and the bleed valve 226 have similar control handles 206C, 213C, 215C, 217C, 222C, and 226C, respectively. Identifying name plates are mounted on the face 251 and are indicated by the corresponding part reference number and a prime; for example, auxiliary supply connection name plate 201′.

The main supply pressure gauge 211, as shown in FIG. 8, is calibrated for pounds per square inches of compressed fluid. The pre-set load gauge 218, as shown in FIG. 8, is calibrated in percent of rated load of the auxiliary hoist control 11, and the transmitted load gauge 225 is calibrated in thousands of pounds of transmitted load.

Figure 9:
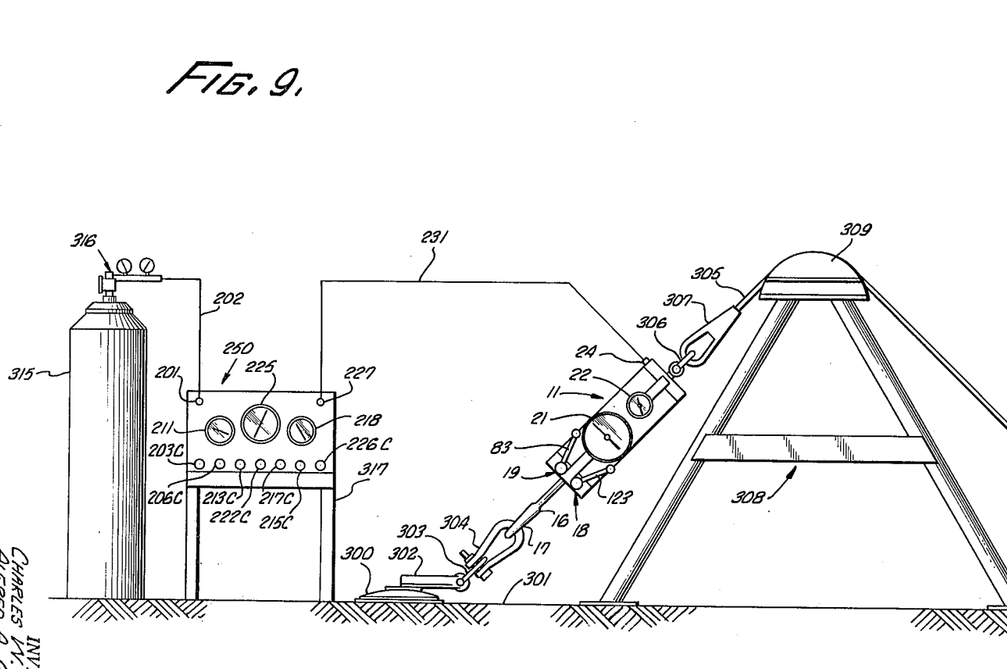
FIGURE 9 is a view of the apparatus according to the invention conducting a tension test; and, FIGURE 10, parts (a) and (b) taken together, is a view of the apparatus according to the invention applying a constant tension to a load.

FIGURE 9 is a view of an apparatus according to the invention for conducting a tensioning test. A vehicular lashing pad 300 is welded to a ship deck 301. The purpose of the tensioning test is to determine whether or not the welding of the vehicular lashing pad 300 to the deck 301 is satisfactory. A pad engaging lug 302 is inserted in the vehicular lashing pad 300. A pair of shackles 303 and 304 connect the pad engaging lug 302 to the lower eye 17 of the auxiliary hoist control 11. The auxiliary hoist control top eye 14 is connected to a cable 305 by a third shackle 306, the pin of which extends through the top eye 14 and the eye of which engages a cable clamp 307 attached to one end of the cable 305. The cable 305 is supported by a test stand 308 and rides over an arcuate channel 309 in the top thereof. The other end of the cable 305 is connected to any adjacent structure which is of sufficient strength to exceed the tension to be applied to the vehicular lashing pad 300.

A bottle 315 of compressed nitrogen is connected to the auxiliary supply connection 201 of the control console 250 by means of the high-pressure inlet line 202. A conventional high-pressure valve assembly 316 is connected to the nitrogen cylinder 315 and serves as an on-off valve for the nitrogen supply.

The control console 250 is supported by a rectangular stand 317 for operator convenience in conducting the test. While the view as shown in FIG. 9 indicates that the control console 250 is positioned adjacent the auxiliary hoist control 11, it is to be understood that this placement is only shown for purposes of convenience in the drawing. In the actual test, the control console 250 and the nitrogen cylinder 315 are preferably positioned at points remote from the auxiliary hoist control 11. Should the structure being tested fail during the test, the possibility of injury to the personnel conducting the test is eliminated by this remote placement.

Furthermore, while the nitrogen cylinder 315 is shown, it is to be understood, as has previously been explained, that the internal supply tank 205 of the control console 250 may be utilized to conduct the tensioning test. Thus, in such an application, the internal supply tank 205 would be filled with nitrogen prior to the positioning of the control console 250, thereby eliminating the necessity for transportation of the nitrogen cylinder 315 to various locations.

To conduct the tensioning test, it is first decided whether the internal tank supply 205 is to be used, or whether the direct connection from the nitrogen cylinder 315 is to be used. For purposes of explanation, it will be assumed that the internal supply tank 205 is to be utilized, and that the internal supply tank 205 has been filled with compressed nitrogen by opening the auxiliary supply shut-off valve 203 and the main supply shutoff valve 206 by means of the controls 203C and 206C, respectively, on the control console 250, while shutting off the system shutoff valve 213 by means of the control 213C. After the internal supply tank 205 has been filled to the desired pressure, as indicated by the main supply gauge 211, the auxiliary supply shutoff valve 203 and the high-pressure valve assembly 316 are closed. The high-pressure inlet line 202 is disconnected, and the control console 250 may then be moved to any position desired, without the necessity of transporting therewith the nitrogen cylinder 315. During transportation of the control console 250, the main supply valve 206 is closed as a safety precaution.

The control console 250 is set up in a position convenient for conducting the test, and is connected to the auxiliary hoist control 11 by means of the high-pressure outlet line 231, which is connected between the compressible fluid inlet connector 24 on the auxiliary hoist control 11 and to the regulated supply connection 227 on the control console 250. The main supply valve 206 is then opened, and the pressure available from the internal supply tank 205 is indicated on the main supply pressure gauge 211.

The maximum pressure which is to be applied to the auxiliary hoist control 11 within should be determined to apply the maximum permissible load to the structure connected to the auxiliary hoist control 11. This maximum pressure is the pressure to be set on the pre-set load gauge 218 by means of the pre-set load regulator 215. The system shutoff valve 213 is opened by means of the control 213C and the pre-set load regulator 215 adjusted by means of the control 215C so as not to indicate more then the miximum load to be transmitted. This setting of the pre-set load regulator 215 insures that the auxiliary hoist control 11 will not itself be damaged during the tensioning test, due to the excessive nitrogen pressure being applied thereto, and that an excessive load will not be applied to the structure under test.

The transmitted load regulator 222 is normally closed by means of the control 222C. The safety shutoff valve 217 is opened by means of the control 217C, applying the pre-set load pressure to the transmitted load regulator 222. The transmitted load regulator 222 is then opened and adjusted so that the transmitted load indicated on the transmitted load gauge 225 is the tension to be applied in the test. It is to be understood that, by the gradual opening of the transmitted load regulator 222, the tension being applied by means of the auxiliary hoist control 11 is gradually increased to the maximum to be applied.

The compressed nitrogen being applied to the auxiliary hoist control passes through the transmitted load regulator 222 and the regulated supply connection 227 and into the compressible fluid space 37 of the auxiliary hoist control 11. The increase in pressure in the compressible fluid space 37 is transmitted through the separator ring 36 to the first hydraulic fluid storage space 35. When the pressure in the first hydraulic fluid storage space 35 exceeds the pressure in the second hydraulic fluid storage space 42, the down valve 18 acts as a dump valve, permitting the passage of hydraulic fluid from the first hydraulic fluid storage space 35 into the second hydraulic fluid storage space 42, as has been explained with respect to FIGS. 5 and 6. By this process, an increase in the tension applied by the auxiliary hoist control 11 is accomplished by increasing the hydraulic fluid pressure on the piston 30 of the auxiliary hoist control 11.

After completion of the tension test, it is necessary to reduce the pressure in the compressible fluid storage space 37. The reason for the pressure reduction will be explained subsequently. This pressure is reduced by closing the safety shutoff valve 217 in the control console 250 and opening the bleed valve 226 by the control 226C. This permits the compressed fluid to escape through the atmospheric vent 232 (see FIG. 7). After the pressure reduction, the piston 30 remains in the same position as it assumed during the tensioning test, since the down valve 18 does not permit dumping of the hydraulic fluid from the second hydraulic fluid storage space 42 into the first hydraulic fluid storage space 35. The hydraulic fluid is released by the clockwise rotation of the down valve handle 123, so as to permit the passage of fluid from the second hydraulic fluid storage space 42 into the first hydraulic fluid storage space 35 and release the tension applied by the auxiliary hoist control 11.

It should be noted that the actual pressure on the piston 30, which is hydraulic fluid pressure within the second hydraulic fluid storage space 42, is indicated by the hydraulic fluid pressure gauge 21 on the auxiliary hoist control 11. The down valve is inoperative upon completion of the tensioning test until the compressible fluid pressure is less than the pressure of the hydraulic fluid in the second hydraulic fluid storage space 42, and the down valve is only operable when such a condition exists. If only a portion of the compressed fluid is vented to the atmosphere and the compressible fluid storage space 37 again sealed, the down valve will function only to permit the transfer of hydraulic fluid from the second hydraulic fluid storage space 42 to the first hydraulic fluid storage space 35 to the point where the compression of the fluid in the compressible fluid storage space 37 by the separator ring 36 movement equalizes the pressures on either side of the separator ring 36. Utilization may be made of this feature in conserving compressible fluid. Rather than venting the total amount of compressible fluid to the atmosphere, only a portion of the fluid is vented. The next test apparatus is set up, and only a comparatively small additional amount of compressible fluid need be aded to the auxiliary hoist control 11 to reach the desired tension.

The apparatus may also be utilized in weighing objects by any of a variety of methods. Perhaps the simplest method by which weighing may be accomplished is by connecting the auxiliary hoist control lower eye 17 to the object to be weighed and applying compressed nitrogen from the control console 250 to the auxiliary hoist control 11 until the object is lifted. The pressure required to lift the object is related to the weight of the object, and, thus, is directly readable on the transmitted load gauge 225 of the control console 259. If an exact weight is required, after lifting the object as just described, the safety shutoff valve 217 is closed and a small amount of compressed nitrogen is vented from the compressible fluid storage space 37 to the atmosphere by means of bleed valve control 226, thus making the pressure in the compressed fluid storage space 37 less than the pressure in the hydraulic fluid storage space 35. The down valve 18 is then operated until the system is in equilibrium, at which point the exact weight of the object is readable on the transmitted load gauge 225.

Figures 10A, 10B:
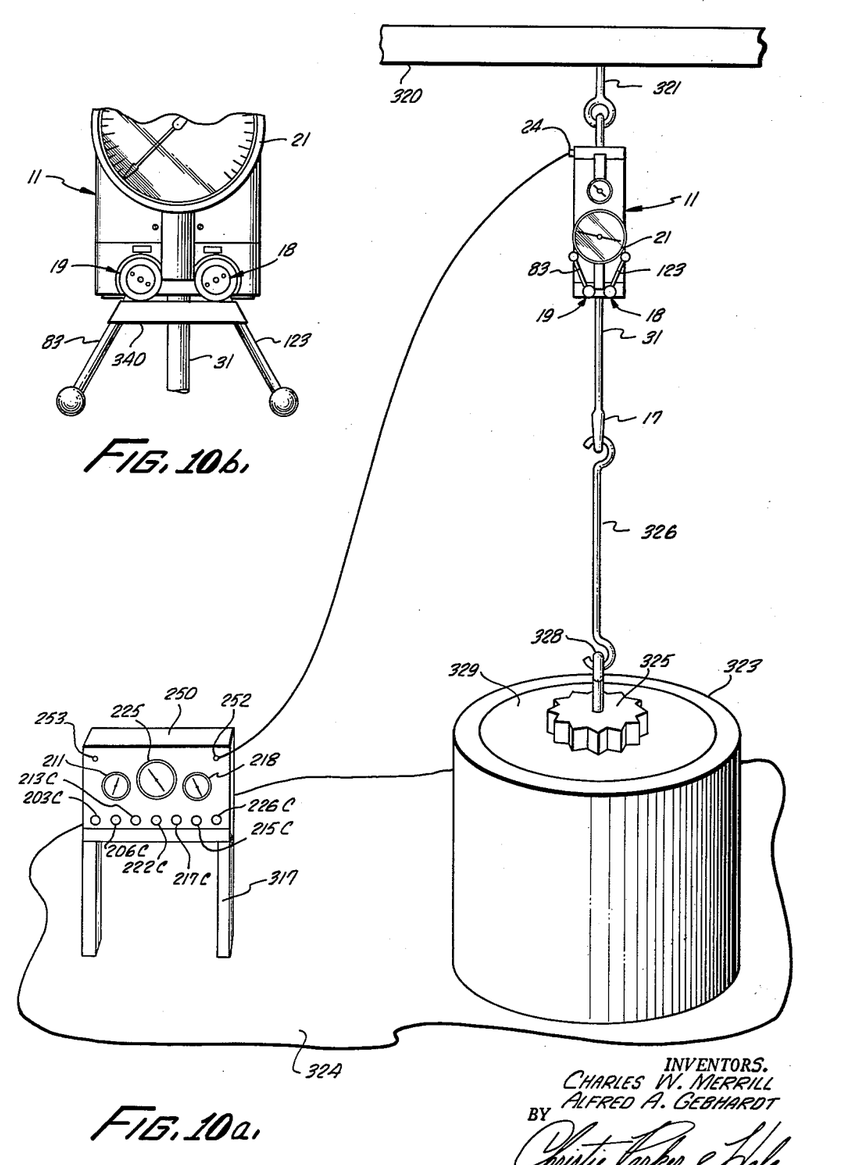

A further refinement of the weighing method just described is illustrated in FIG. 10(a). In FIG. 10(a), an auxiliar hoist control 11 is attached to a beam 320 by means of an eye 321. The beam 320 may be moveable vertically or horizontally by any conventional means, if desired. A mold 322 consists of an outer mold 323, which is positioned on a floor or base 324, and an inner mold 325. The inner mold 325 is connected to the auxiliary hoist control 11 by means of a connecting bar 326 which engages the lower eye 17 of the auxiliary hoist control 11 and an attaching hook 328 on the inner mold 325. Material 329, being molded, is contained between the outer mold 323 and the inner mold 325. The control console 250 is positioned on the stand 317 adjacent the outer mold 323. The regulated pressure outlet line 231 is connected between the auxiliary hoist control 11 and the control console 250, in the same manner as is shown in FIG. 9. The auxiliary hoist control 11 is illustrated with the piston rod 31 in its extended position.

In the particular mold operation illustrated in FIG. 10(a), the material 329 to be molded has the physical characteristic of adhering to the inner mold 325 when in liquid form. In the process of solidification, the material 329 crystallizes and reduces its adherence to the inner mold 325. In this process, if the inner mold 325 is withdrawn from the material 329 prior to the achievement of a state of crystallization such as will maintain the molded configuration, the material 329 will deform and lose the desired configuration. On the other hand, if the material 329 is allowed to set for an excessive period, the mold 322 is unavailable for additional operations. Thus, it will be seen that a particular point in the diminution of the adherence of the material 329 to the inner mold 325, there exists an optimum time for withdrawal of the inner mold 325. This optimum time of withdrawal may be determined by the force required to withdraw the inner mold 325 from the material 329.

For purposes of explanation, assume that the optimum time of withdrawal is when the material 329 adheres to the inner mold 325 to an extent that a force of one hundred pounds is required to lift the inner mold 325 from the material 329. This force is exclusive of the force required to lift the inner mold 325 to overcome the gravitational effect; i.e., the weight of the inner mold 325 itself. The weight of the inner mold 325 is determined by the method previously described. The inner mold 325 is positioned, as shown in FIG. 10, within the outer mold 323, and the material 329 poured therein. The control console 250 is adjusted by the method previously described so that the auxiliary hoist control 11 exerts a lifting force on the inner mold 325 equal to the sum of the weight of the inner mold 325 and the force which is to be exerted to overcome the adherence of the material 329 to the inner mold 325. Assuming that the inner mold 325 weighs seven hundred and fifty pounds, the force set by means of the control console 250 is then the sum of one hundred pounds and seven hundred and fifty pounds, or eight hundred and fifty pounds. The control console 250 is adjusted so that a lifting force of eight hundred and fifty pounds is exerted by the auxiliary hoist control 11 on the inner mold 325. When the material 329 has set to the desired point, the auxiliary hoist control 11 then automatically lifts the inner mold 325 freely of the material 329.

Furthermore, should a portion of the material 329 not have set sufficiently, and therefore, exert an increased resistive force against the withdrawal of the inner mold 325 when the inner mold 325 is partially withdrawn, the withdrawal will stop and the mold 325 will be maintained in this interim position until the particular portion of the material 329 has set to the desired crystalline state. Thus, the auxiliary hoist control 11 and the control console 250 insure that the inner mold 325 is withdrawn from the material 329 only at such time the material 329 has set to the desired state, while insuring optimum utilization time of the mold 325.

The fact that the movement of the inner mold 325 is stopped at the point where the material 329 increases its resistance to withdrawal over the desired one hundred pounds of force illustrates another utilization of the present invention. This utilization consists of the use of the auxiliary hoist control 11 and control console 250 to withdraw or insert close fitting parts. Thus, should any binding occur in the withdrawal or insertion, the movement immediately stops and the articles can be examined to determine the cause of the binding without damage resulting. This utilization is equally applicable both to the vertical setup of the apparatus illustrated in FIG. 10(a), and to a similar horizontal setup. Thus, the auxiliary hoist control 11 and control console 250 are utilizable to horizontally withdraw a part against the force of friction. Should binding occur, the frictional force instantaneously increases, and the withdrawal automatically terminates until such time as the system is adjusted to overcome the binding.

In a further utilization of the apparatus, the auxiliary hoist control 11 and control console 250 are set up as illustrated in FIG. 10(a), and are adjusted so that the force exerted by the auxiliary hoist control 11 exactly equals the weight of the load attached to the auxiliary hoist control 11. The load is then readily moveable either up or down simply by the manual application of a slight amount of force. Thus, a single operator may accurately move and position an extremely heavy object without danger to himself, or without the necessity of utilizing a large number of personnel to direct operations and to perform the necessary positioning.

A further modification of the system is illustrated in FIG. 10(b) taken in combination with FIG. 10(a). In FIG. 10(b), the up pump 19 and down valve 18 have been locked in their opened positions by means of a locking band 340. Depending upon the particular construction utilized for the up pump 19 and the down valve 18, locking either of these assemblies 18 and 19 in the open position may suffice to permit the practice of this alternate embodiment. For example, utilizating the down valve configuration illustrated in FIG. 5, the locking of the down valve assembly 18 in its opened position provides a continuous fluid passage between the hydraulic fluid storage spaces 42 and 35, rather than providing an intermittent passage combined with the dumping feature as is provided when the down valve assembly 18 is closed. A modified form of the control 11 utilizing the valve bore 40 or 41 without the valve assemblies is equally utilizable if the bores are sealed to retain the hydraulic fluid in the control 11. By providing a continuous fluid passage between the two hydraulic fluid storage spaces 42 and 35, the hydraulic pressure in the hydraulic fluid storage spaces 42 and 35 will always be equal. Thus, the tensioning load applied by the auxiliary hoist control 11 is always directly proportional to the pressure of the compressible fluid in the compressible fluid storage space 37. By utilizing the remote control console 250, such as is shown in FIG. 10(a), the load may be directly controlled from a remote position with absolute accuracy. This alternate embodiment avoids the inherent characteristic of the previous embodiments of permitting the hydraulic fluid pressure within the inner hydraulic fluid storage space 42 to exceed the hydraulic fluid pressure within the outer hydraulic fluid storage space 35.

The embodiment illustrated in the combination of FIG. 10(a) and FIG. 10(b) is especially advantageously utilized when the physical characteristic of either the hydraulic fluid or the compressible fluid, or both, change as a result of ambient conditions. Thus, the pressures existing within the system from time to time may change without regard to the external controls or the load applied. For example, if the apparatus is utilized outdoors, where during the day the heat of the sun warms the hydraulic fluid and the compressible fluid so as to cause the expansion of both and during the night cooling occurs so as to cause contraction of both, the actual tensioning force exerted by the hydraulic fluid in the inner hydraulic fluid storage space 42 upon the piston 30 may vary appreciably. This is particularly evident when it is considered that hydraulic fluid is used, hydraulic fluid being substantially incompressible, so that a small amount of fluid expansion results in a greatly increased force on the piston. By providing the continuous fluid passage between the hydraulic fluid storage spaces 42 and 35, the hydraulic fluid pressures in the two hydraulic fluid storage spaces 42 and 35 remain equalized, and the slight amount of expansion of the total volume of hydraulic space required to compensate for the increased volume of the hydraulic fluid is provided by movement of the separator ring 36 so as to slightly compress the compressible fluid in the compressible storage space 37. This compression of the compressible fluid causes the actual pressure exerted by the compressible fluid to rise, so as to increase the actual tensioning load applied to the piston. In order to compensate for this increase in compressible fluid pressure in the just-described modification of this embodiment, a pressure release valve correlated with the transmitted load regulator 222 is provided in the control console 250. This pressure release valve (not shown) functions to vent the compressible fluid storage space 37 to atmosphere when the pressure within the compressible fluid storage space, which pressure is, of course, transmitted back through the regulated supply connection 227 to the transmit load gauge 225 (FIG. 7), exceeds a pre-set differential with respect to the setting of the transmitted load regulator 222. This pre-set differential is set in the pressure release valve. Thus, upon an increase at pressure above this pre-set differential, the pressure in the compressible fluid storage space 37 will be maintained at the differential pressure by means of the pressure release valve. When the hydraulic fluid and compressible fluid contract due to cooling, the transmitted load regulator 222 functions to maintain the pre-set tension by admitting additional compressible fluid from the compressible fluid source or internal supply tank into the compressible fluid storage space.

This latter modification is particularly advantageous in supporting structures which, of themselves, are not sufficiently rigid to maintain their configuration without deformation. For example, in the preparation of rocket missiles for firing, the missile is set up on the launching pad for a period varying from a few hours to many days, in order to fuel the missile and make the necessary prelaunching checks. Many missiles currently in use have a structural frame which has been weakened in order to provide for a greater pay load. The frame is weakened to such an extent that the missile is unable to stand on the launching pad unsupported without undergoing serious deformation, which renders the missile unsuitable for true flight. It has, therefore, been conventional practice to support the missile by a steel cable attached to a rigid support frame. However, as the missile, cable, and frame undergo expansion and contraction, due to temperature and pressure changes, a serious amount of deformation still occurs. Using the modification just described, the missile is readily supported from a rigid frame by means of the above-described apparatus. The control 11 is connected between the missile and supporting frame and the remote control console 250 is positioned at any convenient point and operates to maintain the required constant stress on the missile. Both the frame and missible may then expand and contract as required without the missile undergoing any serious deformative stress due either to its own expansion and contraction or the expansion and contraction of the frame and supporting structure.

The invention claimed is:

1. Remotely controlled positioning, tensioning and weight measuring apparatus comprising a first cylinder, a piston positioned within the first cylinder, a second cylinder of greater diameter than the first cylinder positioned thereabout so as to form an annular space therebetween, a movable separator ring positioned within the annular space so as to divide said space into a compressible fluid space and a first hydraulic fluid storage space, a first cylinder head assembly closing one end of each of said cylinders so as to close the compressible fluid space and including means for venting the space between the piston and the first cylinder head, a second cylinder head assembly closing the other end of each of said cylinders so as to close the first hydraulic fluid space and to form a second hydraulic fluid storage space between the second cylinder head assembly and the piston and including a fluid communication passage connecting the first and second hydraulic fluid spaces, a piston rod connected to the piston and extending through the second cylinder head assembly, means selectively operable to pass hydraulic fluid contained in the second hydraulic fluid space into the first hydraulic fluid space when the hydraulic pressure in the second hydraulic fluid space exceeds the hydraulic pressure in the first hydraulic fluid space, and means remote from said cylinders for selectively increasing and decreasing the pressure of compressible fluid in the compressible fluid storage space.

2. Remotely controlled positioning, tensioning and weight measuring apparatus comprising a first cylinder, a piston positioned within the first cylinder, a second cylinder of greater diameter than the first cylinder positioned thereabout so as to form an annular space therebetween, a movable separator ring positioned within the annular space so as to divide said space into a compressible fluid space and a first hydraulic fluid space, a first cylinder head assembly closing one end of each of said cylinders so as to seal the compressible fluid space and including means for venting the space between the piston and the first cylinder head, a second cylinder head assembly closing the other end of each of said cylinders so as to form a second hydraulic fluid space between the second cylinder head assembly and the piston and including a fluid communication passage connecting the first and second hydraulic fluid spaces, a piston rod connected to the piston and extending through the second cylinder head assembly, a down valve associated with said fluid communication passage and including as a first unit a valve seat having an orifice in the fluid communication passage and an extended tubular aligning section positioned between the orifice and the outlet from the second hydraulic fluid space to said communication passage and as a second unit a valve piston consisting of a frusto-conical piston head positioned in said orifice and opening on to a shoulder of a substantially rectangular valve body contained within the tubular aligning section, the rectangular valve body terminating in a stem located adjacent said second hydraulic fluid storage outlet, a helper spring compressibly held against said stem so as to urge the shoulder against the side of the orifice adjacent said shoulder, down valve actuating means selectively operable to displace the piston head in direction of the outlet, the second hydraulic fluid space to permit the passage of fluid through the annular volume formed between the orifice and the piston head, means for controlling the pressure of compressible fluid within the compressible fluid space, a source of a compressible fluid under pressure located remote from the cylinders, and control means connected between the fluid source and the first compressible fluid space and selectively operable to apply a selectable pressure of compressible fluid to the compressible fluid storage space.

3. Apparatus as described in claim 2 in which the control means includes a control console comprising a plurality of serially connected valves in which one end of the series is connected to the source of compressible fluid and the other end is connected to the compressible fluid space.

4. Apparatus as described in claim 3 in which the control console includes high pressure compressible fluid storage means connected to the series of valves in parallel with the compressible fluid source connection, and including an auxiliary supply control valve connected between the high pressure fluid storage means and the series of valves, and a main supply control valve connected between the source of compressible fluid and the series of valves.

5. Apparatus as described in claim 4 in which the series of valves includes system supply pressure regulation control means and preload pressure regulation control means serially connected to a regulated pressure outlet and pressure release valve means connected between the preload pressure regulation control means and the regulated pressure outlet.

6. Apparatus as described in claim 5 and including means for indicating the magnitude of the pressure applied to the system supply pressure regulation control means, means for indicating the magnitude of the pressure applied to the preload pressure regulation control means, and means for indicating the magnitude of the pressure applied to the regulated pressure outlet.

7. Apparatus as described in claim 6 in which both the system supply pressure regulation control means and the preload pressure regulation control means include a fluid on-off control valve connected on its downstream side to a fluid pressure regulation valve.

8. Remotely controlled positioning, tensioning and weight measuring apparatus comprising a first cylinder, a piston positioned within the first cylinder, a second cylinder of greater diameter than the first cylinder positioned thereabout so as to form an annular space therebetween, a movable separator ring positioned within the annular space so as to divide said space into a compressible fluid space and a first hydraulic fluid storage space, a first cylinder head assembly closing one end of each of said cylinders so as to close the compressible fluid space and including means for venting the space between the piston and the first cylinder head, a second cylinder head assembly closing the other end of each of said cylinders so as to close the first hydraulic fluid space and to form a second hydraulic fluid storage space between the second cylinder head assembly and the piston, a fluid communication passage connecting the first and second hydraulic fluid spaces, a piston rod connected to the piston and extending through the second cylinder head assembly, means for attaching said piston rod to a load, hydraulic fluid contained in the hydraulic fluid storage spaces, compressible fluid contained in the compressible fluid storage space, and means remote from said cylinders for selectively increasing and decreasing the pressure of compressible fluid in the compressible fluid storage space.

9. Apparatus as described in claim 8 and including a source of compressible fluid in which the control means includes a control console comprising a plurality of serially connected valves, one end of the series being connected to the source of compressible fluid and the other end being connected to the compressible fluid space.

10. Apparatus as described in claim 9 in which the control console includes high pressure compressible fluid storage means connected to the series of valves in parallel with the compressible fluid source connection, and including an auxiliary supply control valve connected between the high pressure fluid storage means and the series of valves, and a main supply control valve connected between the source of compressible fluid and the series of valves.

11. Apparatus as described in claim 10 in which the series of valves includes system supply pressure regulation control means and preload pressure regulation control means serially connected to a regulated pressure outlet and pressure release valve means connected between the preload pressure regulation control means and the regulated pressure outlet.

12. Apparatus as described in claim 11 and including means for indicating the magnitude of the pressure applied to the system supply pressure regulation control means, means for indicating the magnitude of the pressure applied to the preload pressure regulation control means, and means for indicating the magnitude of the pressure applied to the regulated pressure outlet.

13. Apparatus as described in claim 12 in which both the system supply pressure regulation control means and the preload pressure regulation control means include a fluid on-off control valve connected on its downstream side to a fluid pressure regulation valve.

References Cited in the file of this patent

UNITED STATES PATENTS 2,310,974    Lumm               Feb. 16, 1943
2,703,008    Seljos et al.           Mar. 1, 1955